United States Patent [19]
Phillips et al.

[11] Patent Number: 5,684,702
[45] Date of Patent: Nov. 4, 1997

[54] CONTROL SYSTEM HAVING DATA CORRELATION FOR CONTROLLING A VEHICULAR ANTI-LOCK BRAKING SYSTEM

[75] Inventors: Mark Ian Phillips, Birmingham; John Anthony Bolton, West Midlands; Anthony John Ainsworth, Essington, all of Great Britain

[73] Assignee: Lucas Industries plc, West Midlands, England

[21] Appl. No.: 261,471

[22] Filed: Jun. 16, 1994

Related U.S. Application Data

[63] Continuation of Ser. No. 821,942, Jan. 17, 1992, abandoned.

[30] Foreign Application Priority Data

Jan. 19, 1991 [GB] United Kingdom ............... 9101227

[51] Int. Cl.$^6$ .............................. G06F 7/70; H03M 13/00
[52] U.S. Cl. .................... 364/426.021; 364/426.01; 364/426.015; 364/426.023; 364/424.058; 371/67.1; 371/68.1; 303/122.11; 303/170; 303/176
[58] Field of Search ............... 364/426.02, 424.05, 364/424.01, 431.04, 431.11, 431.12, 431.06, 431.05, 131, 133, 136, 426.015, 426.019, 426.021, 426.028, 424.045, 424.058, 426.027; 395/275, 375, 425, 184.01, 185.01, 183.01, 183.06, 183.07, 421.01, 497.04, 426, 439; 303/122.05, 22.11, 113.1, 122.01, 122.02, 122.06, 122.09, 131, 166; 180/141, 142, 170, 179, 287; 371/67.1, 68.1, 71, 21.1, 21.2

[56] References Cited

U.S. PATENT DOCUMENTS

| | | | |
|---|---|---|---|
| 3,618,015 | 11/1971 | Homonick | 371/68.1 |
| 4,198,678 | 4/1980 | Maatje et al. | 364/426.01 |
| 4,358,823 | 11/1982 | McDonald et al. | 371/68 |
| 4,493,210 | 1/1985 | Fries et al. | 303/92 |
| 4,546,437 | 10/1985 | Bleckmann et al. | 364/426.01 |
| 4,656,588 | 4/1987 | Kubo | 364/426.02 |
| 4,663,715 | 5/1987 | Kubo | 364/426.02 |
| 4,701,854 | 10/1987 | Matsuda | 364/426.02 |
| 4,773,072 | 9/1988 | Fennel | 364/426.02 |
| 4,847,757 | 7/1989 | Smith | 395/275 |
| 4,917,443 | 4/1990 | Kramer et al. | 303/92 |
| 5,091,856 | 2/1992 | Hasegawa et al. | 364/424.05 |
| 5,099,417 | 3/1992 | Magar et al. | 395/425 |
| 5,123,497 | 6/1992 | Yopp et al. | 364/424.01 |
| 5,175,841 | 12/1992 | Magar et al. | 395/425 |
| 5,189,617 | 2/1993 | Shiraishi | 364/424.05 |
| 5,193,887 | 3/1993 | Bleckmann et al. | 364/426.03 |

FOREIGN PATENT DOCUMENTS 2127507 4/1984 United Kingdom .

*Primary Examiner*—Jacques Louis-Jacques
*Attorney, Agent, or Firm*—Nixon & Vanderhye P.C.

[57] ABSTRACT

In a control system, for instance forming part of a vehicle anti-lock brake system, a plurality of control processors provides similar or identical control signals of the system in response to a shared transducer input. An independent data correlation processor compares data generated in the control processors for correlation and, in the absence of proper correlation, provides an indication which may be used to disable anti-lock operation of the brake system. In preferred embodiments, a four wheel vehicle with an anti-lock brake system is monitored by dual microprocessors. Each wheel has a speed sensor which supplies an input to each microprocessor. The data correlation processor compares the outputs of the microprocessors for each wheel and sends and alarm or disables the anti-lock brake system if the difference in the microprocessors output is beyond a limit amount.

3 Claims, 4 Drawing Sheets

CONTROL SYSTEM HAVING DATA CORRELATION FOR CONTROLLING A VEHICULAR ANTI-LOCK BRAKING SYSTEM

This application is a continuation of U.S. application Ser. No. 07/821,942 filed on Jan. 17, 1992, now abandoned.

BACKGROUND OF THE INVENTION

1. Field of the Invention

The present invention relates to a control system, for instance of the type having a plurality of controllers which receive the same or similar input data and produce outputs which, during normal operation of the system, have the same or similar values.

2. Discussion of Prior Art

Vehicle braking systems must operate with a very high degree of reliability. In the case of anti-lock brake systems, it is essential that the braking force should only be released in response to correct detection of wheel-lock or incipient wheel-lock. In order to prevent incorrect operation of electronic anti-lock control systems from releasing the braking force as a result of faulty operation of the electronics, it has become common for anti-lock braking systems to include a plurality of controllers working in parallel.

Vehicle anti-lock brake systems are generally controlled by microprocessors or microcomputers so as to control the application of braking force in accordance with measured vehicle wheel speeds. For instance, when the measured speed of a wheel indicates that the wheel is in an incipient lock condition, braking force applied to that wheel is reduced or removed until the wheel recovers or begins to recover from wheel-lock or incipient wheel-lock. In hydraulically actuated brake systems, this is achieved by releasing the hydraulic pressure to the brake actuators.

All of the controllers may receive the same input data, for instance from wheel speed sensors, and are intended to supply the same output signals for controlling anti-lock operation. The output signals may be compared with each other and, if they are not sufficiently similar, remedial action may be taken. If a faulty controller is identified and ignored, the anti-lock function can be inhibited to prevent possible loss of vehicle braking. Some form of warning is usually given to indicate to a driver that anti-lock operation is no longer available.

The individual controllers may be identical but independent of each other, in which case the controller outputs should be identical (allowing for tolerances, such as small timing differences in digital systems). However, although very unlikely, it is possible that the same fault may arise in identical controllers. Accordingly, in order to provide an even greater degree of security, it is possible for the controllers to be embodied differently so that the simultaneous occurrence of a fault is less likely and, even if it does happen, the faulty outputs from the controllers will differ from each other.

In controllers embodied by programmed microprocessors, it is becoming common for the individual microprocessors to be arranged to cross-check the operations of each other. In the case of systems using a plurality of identical controllers, this can be done by periodically checking that data calculated independently in the different controllers are identical (allowing for possible small differences in timing). Such a technique can be adapted for use with non-identical controllers, since even such non-identical controllers will nevertheless generally calculate some parameters, such as wheel speed, which should be substantially identical during normal operation.

It has been found that such cross-checking operation consumes a significant portion of the operational capability of each controller. Thus, in order to ensure that each controller can fulfil its role as an anti-lock controller while performing cross-checking, more powerful (faster and/or larger) microprocessor controllers have to be used. This in turn leads to greater complexity which, in extreme cases, can actually reduce the reliability of the system, together with increased cost.

SUMMARY OF THE INVENTION

According to the invention, there is provided a control system comprising a plurality of controllers and arbitration means for arbitrating between the controllers, characterised in that the arbitration means comprises a data processor arranged to compare data from the controllers for correlation and to provide an indication when lack of correlation is detected.

The controllers may be arranged to perform an automotive control function, such as anti-lock brake control for a vehicle.

By removing the cross-checking or scrutinzing of data from the controllers and delegating it to a separate data processor, the controllers can concentrate, for instance, on anti-lock control. The controllers are thus not slowed down by having to perform cross-checking and need only be powerful e.g. fast, enough to perform anti-lock control. A relatively less powerful data processor may be used for the correlation checking operation while allowing more thorough comparison of data to be performed. For instance, a larger number of parameters of the controllers can be checked for correlation.

In the case of controllers embodied as data processors e.g. microprocessors, the system preferably comprises a respective memory for each controller for receiving data therefrom and the data processor is preferably arranged to check the data in the memories for correlation. The memories may be embodied independently or may form parts (defined in hardware and/or software) of a data processor memory. The memories may form part of the controllers.

Each memory may comprise a write only part, arranged to receive data automatically from the corresponding controller, and a read only part arranged to contain a copy of the data written in the write only part and to be read only by the data processor. The write only and read only parts may be defined by hardware and/or software. It is thus possible to ensure that the data correlation is entirely independent of the controllers and cannot be affected by any faulty operation occurring in the controllers.

It is also possible to provide a method of arbitrating between a plurality of controllers, comprising comparing in a data processor data from the controllers for correlation and providing an indication when lack of correlation is detected.

BRIEF DESCRIPTION OF THE DRAWINGS

The invention will be further described, by way of example, with reference to the accompanying drawings, in which.

DETAILED DISCUSSION OF PREFERRED EMBODIMENTS

Figure 1:
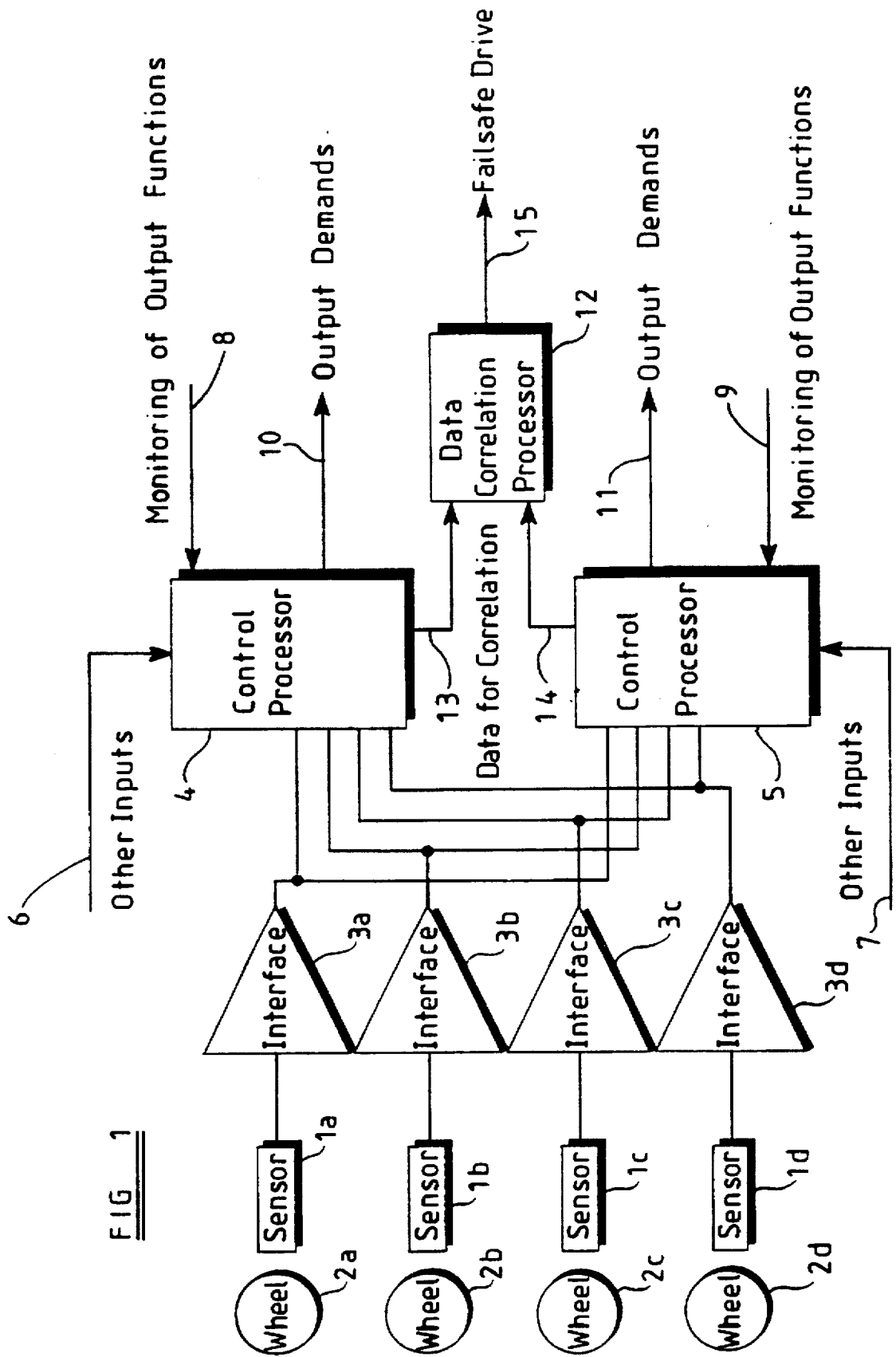
FIG. 1 is a schematic lock diagram of part of an anti-block brake system including an apparatus constituting a preferred embodiment of the invention.

An anti-lock braking system for use in a road vehicle comprises four wheel speed sensors 1a to 1d which cooperate with road wheels 2a to 2d of the vehicle to provide signals representing wheel speed. For instance, each sensor may be a variable reluctance transducer cooperating with teeth which rotate with the corresponding wheel so that the sensor produces an oscillating waveform whose frequency is proportional to wheel speed. Each of the sensors 1a to 1d is connected to an interface circuit 3a to 3d for interfacing between the sensors and first and second control processors 4 and 5. Such interfaces condition the waveform from the sensors to produce outputs which are compatible with digital signal levels used by the processors 4 and 5. The outputs of interfaces 3a to 3d are each connected to both of the control processors 4 and 5.

The control processors 4 and 5 are preferably each embodied as a microcomputer or microprocessor for controlling anti-lock brake operation. The processors have other inputs shown at 6 and 7 for receiving inputs from other transducers which monitor the performance of the vehicle. The processors have monitoring inputs 8 and 9 for receiving input signals indicating the performance of actuators or the like forming part of the vehicle brake system. The processors 4 and 5 have outputs 10 and 11 which supply output demands for driving actuators, such as a debooster or modulator for releasing brake pressure in an hydraulically actuated vehicle brake system.

The system further includes a data correlation processor 12 connected via buses 13 and 14 to the first and second control processors 4 and 5, respectively. The data correlation processor 12 has an output 15 which supplies failsafe drive signals, for instance for disabling the anti-lock system so as to prevent brake release resulting from faulty operation.

Figure 2:
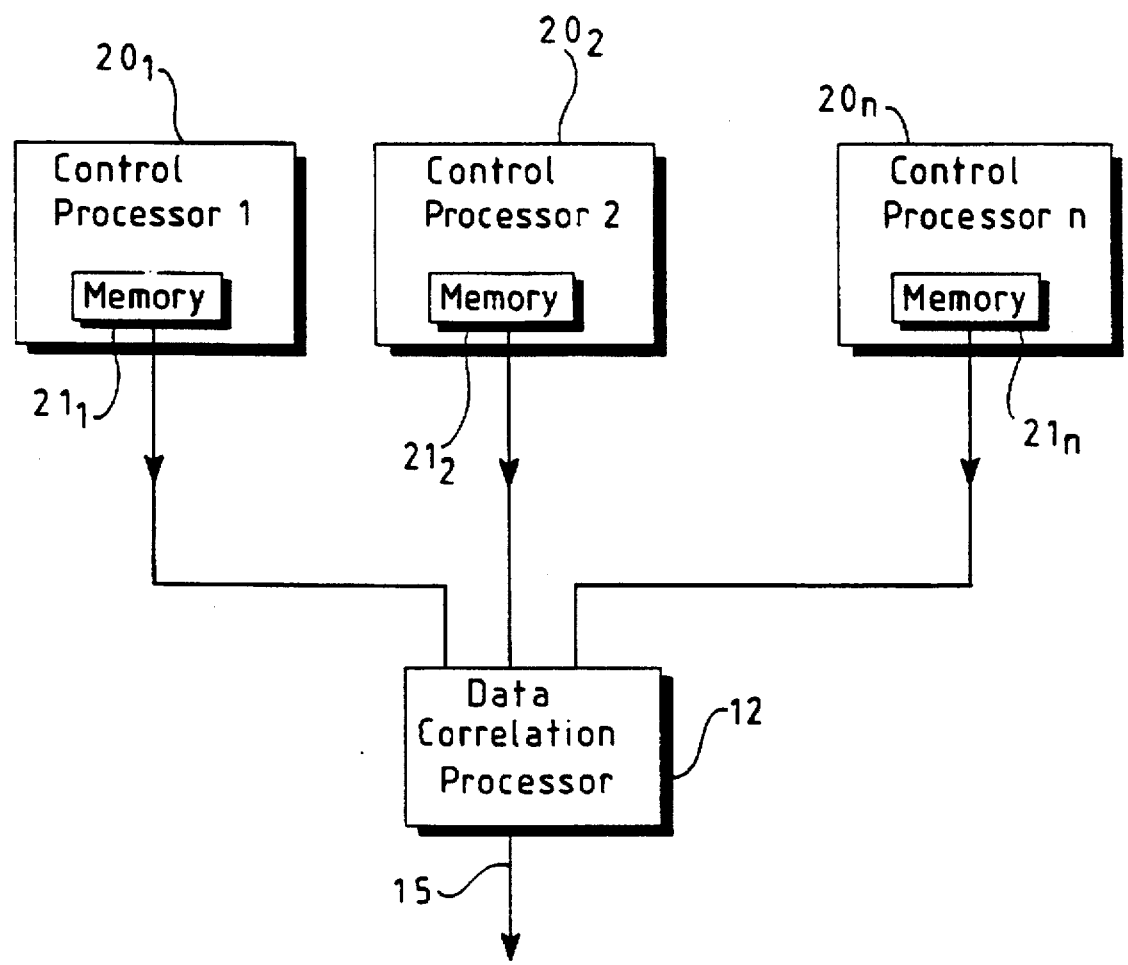
FIG. 2 is a block diagram of the apparatus shown in FIG. 1.

FIG. 2 is a block diagram illustrating schematically the data correlation processor 12 and n control processors (only two such processors are used in the system of FIG. 1). The control processors $20_1$ to $20_n$ have respective data memories $21_1$ to $21_n$ in which are stored data resulting from operation of the respective processor. Such data may comprise calculated wheel speeds, calculated wheel decelerations, calculated output demands, measured vehicle parameters (such as vehicle speed, deceleration, yaw, loading, and brake lamp status), and road surface condition. The data correlation processor 12 is connected to the memories $21_1$ to $21_n$ by respective buses $22_1$ to $22_n$ which provide read-only access to the data memories $21_1$ to $21_n$, respectively.

Further details of operation of the control processors shown in FIGS. 1 and 2 will not be given as it is of no relevance to the present invention.

Figure 3:
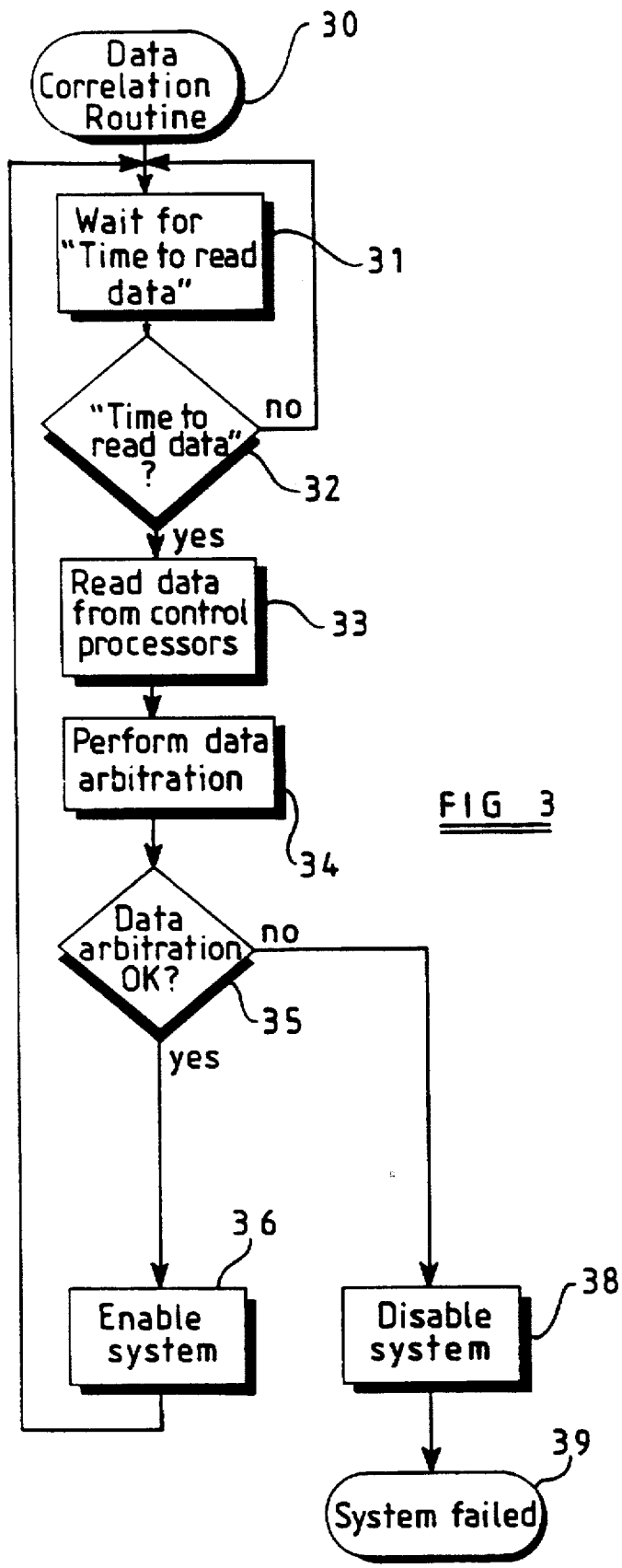
FIGS. 3 and 4 are flow diagrams illustrating operation of the apparatus shown in FIG. 2.
Figure 4:
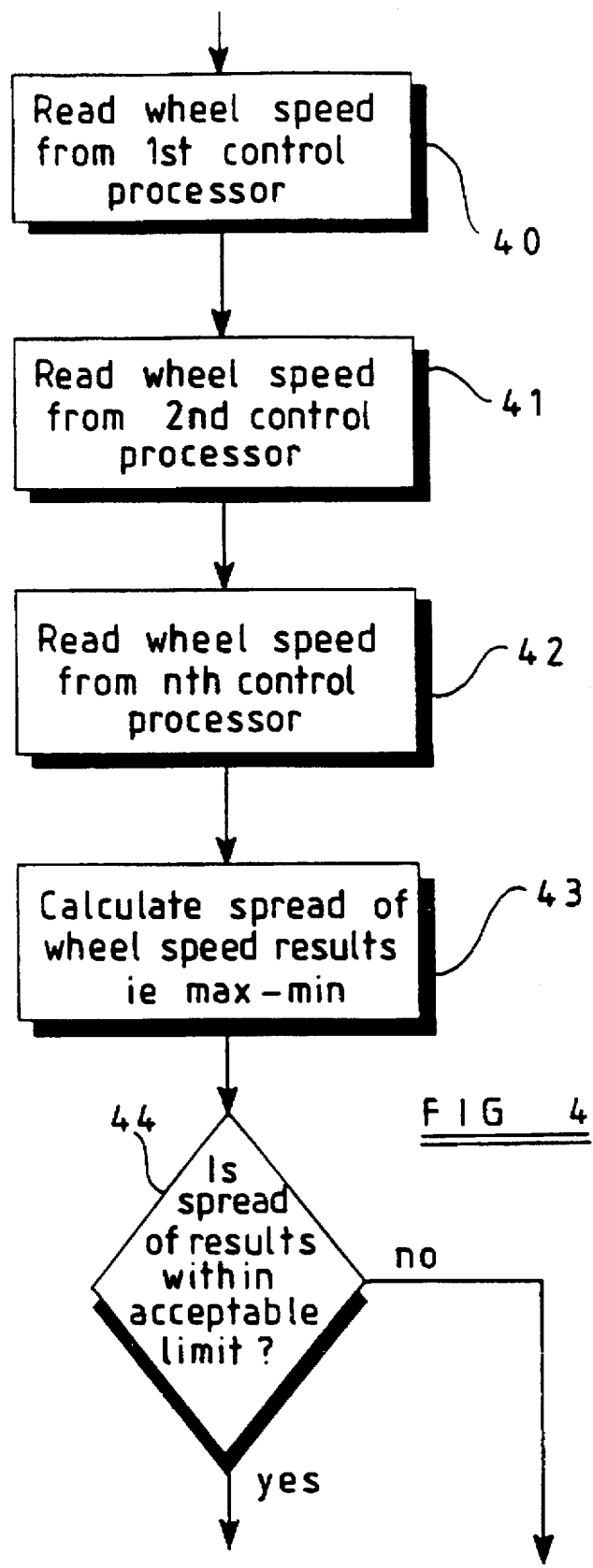

Operation of the data correlation processor 12 is illustrated in FIGS. 3 and 4 in the form of flow charts. FIG. 3 shows a data correlation routine 30 which is periodically performed by the data correlation processor. At 31 and 32, the processor enters a loop until the data which it requires are available for reading in the data memories of all of the control processors. When the data are available, they are read at 33 and a data arbitration is performed at 34. Step 35 determines whether the result of the data arbitration is acceptable or not. If so, step 36 enables the anti-lock system and control is returned to step 31. If not, then the anti-lock system is disabled at 38 and an indication of system failure is provided at 39 so as to warn a vehicle driver that the brake system is functioning without the facility of anti-lock operation.

An example data arbitration 34 and checking 35 is shown in more detail in FIG. 4. In particular, FIG. 4 illustrates arbitration in respect of wheel speed, but such arbitration may comprise several similar routines performed in sequence in respect of the various parameters for which arbitration is performed. At 40, the wheel speed in respect of the first control processor is read. The wheel speeds in respect of the second to nth processors are read at 41 and 42 and, at 43, the spread of wheel speeds is calculated, for instance as the difference between the maximum and minimum values of wheel speeds produced by the control processors. At 44, the spread is compared with an acceptable limit to determine whether it is within that limit. If so, then the step 36 is performed; if not, then the step 38 is performed.

For the step 44, the acceptable limit of spread may depend on wheel or vehicle speed. For instance, the acceptable limit may be one kilometer per hour for speeds between 0 and 100 kilometers per hour, 2 kilometers per hour for speeds between 100 and 200 kilometers per hour, 3 kilometers per hour for speeds between 200 and 300 kilometers per hour, and 4 kilometers per hour for speeds above 300 kilometers per hour.

In the embodiment shown in the drawings, the data correlation processor 12 has read-only access to the memories $21_1$-$21_n$ of the control processors $20_1$-$20_n$. If inadequate correlation among the control processors $20_1$-$20_n$ is detected, the data correlation processor cannot intervene in operation of the control processors $20_1$-$20_n$ but can merely give a warning of a fault and, via its output 15, disable antilock operation of the brakes so as to prevent failure of the brake system or incorrect operation of the antilock system. In a simplified arrangement, only a warning could be given so that the data correlation processor 12 could not influence or affect the operation of the braking system.

Various modifications may be made within the scope of the invention. For instance, in a system where, at any particular time, a flag is set to indicate which of the control processors $20_1$-$20_n$ is in command of antilock operation, the data correlation processor 12 may be arranged to have write access to setting of the flags, for instance in the memories $21_1$-$21_n$ of the control processors. When the data correlation processor 12 detects a discrepancy among the control processors, it is arranged to control setting of the flags so as to determine which of the control processors assumes command. For instance, if all of the control processors except one agree, the data correlation processor can ensure that the one processor is not selected for command of the antilock system.

Alternatively, the data correlation processor 12 may be given both read and write access to the memories $21_1$-$21_n$. In this case, the data correlation processor may alter flags and data within the memories $21_1$-$21_n$ and may thus attempt to correct erroneous data or test operation of an apparently faulty control processor.

Data correlation and arbitration can therefore be performed without impinging on operation of the control processors. The speeds and/or sizes of the control processors do not therefore need to be increased in order to perform correlation. The data correlation processor can be embodied as a relatively simple processor, such as a microcomputer or microprocessor. Thus, the capabilities of the system can be augmented while ensuring that effective arbitration is provided so as to improve the reliability of operation of the system.

We claim:

1. A control system comprising:

a plurality of controllers, each of said controllers performing a substantially identical function and comprising a means, responsive to a common input, for providing a substantially identical control function output data; and arbitration means for arbitrating between said controllers, said arbitration means comprising a data processor means for comparing said data from each of said controllers for correlation and for providing an output indication of lack of correlation of said data, wherein each of said controllers comprises a control data processor and a memory for receiving parameter data from said control data processor, said data processor means receiving the parameter data from said memories and checking the parameter data for correlation and said memory of each of said controllers has a write only part for receiving the parameter data automatically from said control data processor and a read only part containing a copy of the parameter data written in said write only part for reading only by said data processor means.

2. A system for controlling the disabling of a vehicular anti-lock brake control system for a vehicle having wheels where the anti-lock system reduces braking pressure on a wheel which is determined to be locking, said disabling controlling system including:

a plurality of wheel speed sensor means for providing an output indicative of the rotational speed of a respective wheel;

a plurality of controllers, each of said controllers comprising a means, responsive to at least one wheel speed sensor means output, for providing data for substantially identical control functions;

arbitration means for arbitrating between said controllers, said arbitration means comprising a data processor means for comparing said data from said controllers for correlation and for providing an output indication of an mount of correlation of said data; and means, responsive to said data processor means output indication of an amount of correlation of said data being less than a limit, for at least providing an alarm signal suggesting that an operator of the vehicle disable said anti-lock system, wherein said means for providing an alarm signal includes a means for disabling at least the brake pressure reduction of said anti-lock system, wherein said vehicle has four wheels, said plurality of speed sensor means comprises at least four speed sensors, at least one of said speed sensors associated with a respective one of said four wheels, said plurality of controllers comprising two microprocessors, each of said microprocessors including a separate channel responsive to each of said at least four speed sensors and the output from each sensor means is applied to each microprocessor, wherein said output data is data representative of wheel speed, and said correlation comprises comparison of the wheel speed data for one wheel applied to both microprocessors, and said limit of correlation is a function of the wheel speed, wherein said wheel speed data is reflective of wheel speeds from 0 to greater than 300 kilometers per hour, and said limit of correlation for the wheel speed range between 0 and 100 kilometers per hour is data indicative of a wheel speed difference of 1 kilometer per hour, said limit of correlation for the wheel speed range between 100 and 200 kilometers per hour is data indicative of a wheel speed difference of 2 kilometers per hour, said limit of correlation for the wheel speed range between 200 and 300 kilometers per hour is data indicative of a wheel speed difference of 3 kilometers per hour, and said limit of correlation for the wheel speed range of greater than 300 kilometers per hour is data indicative of a wheel speed difference of 4 kilometers per hour.

3. A control system comprising:

a plurality of controllers, each of said controllers having an input means responsive to common input data, and arbitration means for arbitrating between said controllers, said arbitration means comprising a data processor for comparing data from said controllers for correlation and for providing an indication of lack of correlation, wherein each of said plurality of controllers performs a substantially identical function, wherein each of said controllers comprises a control data processor and a memory for receiving parameter data from said control data processor, said data processor receiving the parameter data from said memories and checking the parameter data for correlation and said memory of each of said controllers has a write only part for receiving the parameter data automatically from said control data processor and a read only part containing a copy of the parameter data written in said write only part for reading only by said data processor.

\* \* \* \* \*